(No Model.)
G. CHANIER.
BRAKE SHOE.
No. 299,621. Patented June 3, 1884.
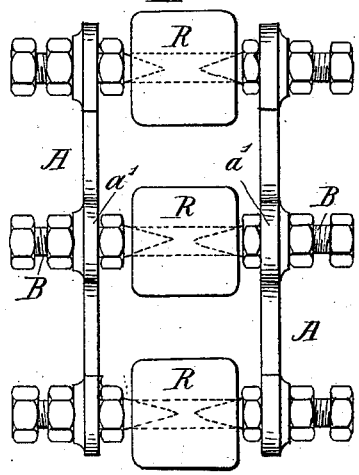
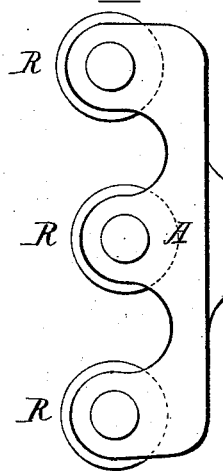
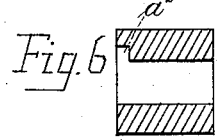
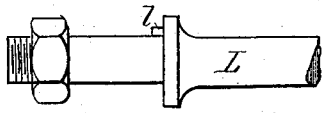
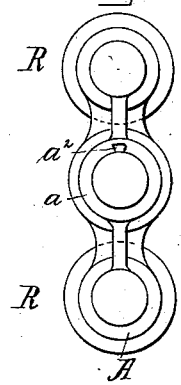
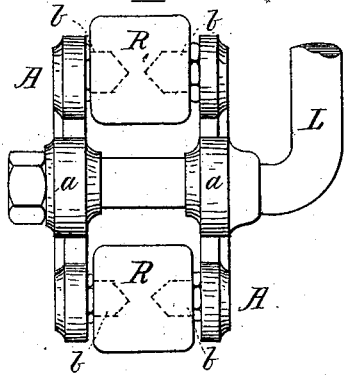
Witnesses:
N. E. Poulter.
J. W. Knotts.
Inventor:
Gabriel Chanier
fr. Henry Orth
his att'y

United States Patent Office.

GABRIEL CHANIER, OF LE DONJON, FRANCE.

BRAKE-SHOE.

SPECIFICATION forming part of Letters Patent No. 299,621, dated June 3, 1884.

Application filed February 21, 1884. (No model.) Patented in France August 13, 1883, No. 156,983.

*To all whom it may concern:*

Be it known that I, GABRIEL CHANIER, a citizen of the French Republic, residing at Le Donjon, in the French Republic, have invented certain new and useful Improvements in Brake-Shoes for Vehicles, (for which I have obtained Letters Patent in France, No. 156,983, under date of August 13, 1883;) and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to novel improvements in the construction of brakes or brake-shoes more especially designed for the lighter class of vehicles, such as carriages, landaus, &c.

The object of the invention is to prevent the unequal wear or flattening of the tire, as is the case when the ordinary brake-shoe having a plane and rigid bearing-surface is employed, whereby the tire is more or less flattened or worn at the points where the brake is applied; and the invention consists, principally, in providing the brake-shoe with a rolling bearing-surface, which, when brought in contact with the tire of the wheel, will not absolutely lock the latter, but allow it to rotate, while exerting a constant pressure thereon to retard its movements.

Various means may be employed in carrying out my invention, and the bearing-surface of the shoe may be increased or diminished at will, according to the nature of the vehicle to which it is intended to be applied, the extent of bearing-surface to be brought in contact with the tire of the wheel depending on the weight of the vehicle itself, as well as on its carrying capacity. Nor do I wish to be understood as limiting myself in the use or application of the brake-shoe to vehicles of light draft and limited carrying capacity, as said shoe may be advantageously applied to vehicles of heavy draft and comparatively great carrying capacity.

Inasmuch as the invention is limited to the construction and arrangement of the shoe itself, and does not comprehend any part of the brake mechanism itself, and as the shoe may be readily constructed for application to any style or form of brake lever or mechanism, I have deemed it unnecessary to describe and illustrate those appliances by means of which the brake-shoe is applied to the tire of the wheel of a vehicle.

In the accompanying drawings, Figure 1 is a front elevation, and Fig. 2 a side elevation, of one form of brake-shoe, the brake-lever being removed in the latter figure. Figs. 3 and 4 are corresponding views of another form of brake-shoe, the brake-lever being removed in both figures. Fig. 5 is an elevation of a portion of the brake-lever; and Fig. 6, a section on line $x\ x$ of one of the bearings for said lever, looking toward the right.

Like letters of reference indicate like parts wherever such may occur in the above figures of drawings.

Referring to Figs. 1 and 2, A A indicate two plates or cheeks, that constitute the sides of the shoe, and in which are formed bearings $a$ for the reception and passage of the brake-lever L, of any suitable construction, said lever constituting the retaining device to hold the cheeks in proper position. Upon the inside of the cheeks A are formed or secured conical bearing-lugs $b$, upon which are mounted two or more rollers, R. The brake-lever L passes through the bearings $a$, formed in the cheeks A of the brake-shoe, and is secured by a nut. The lever may pass loosely through these bearings, or the outer bearing may be provided with a segmental recess, $a^2$, of about ninety degrees in extent, into which fits a stud, $l$, Fig. 5, on the brake-lever, of such size as to leave sufficient play to permit the shoe to adapt itself snugly to the tire of the wheel. For very light vehicles two rollers will be sufficient; but for larger vehicles a greater number of rollers are employed—as, for instance, three, as shown in Figs. 3 and 4, or more, if desired or necessary.

Instead of forming the conical or pointed bearings on the cheeks A of the shoe, the rollers R may be pivoted on pointed screws or screw-bolts B, provided with suitable tightening and check nuts, as shown in said Figs. 3 and 4. In this case the bearings for the brake-lever, instead of being formed in the cheeks A, as in Figs. 1 and 2, are formed in lugs or projections $a'$ of such cheeks, as shown.

To give the shoe greater power of resistance as the bearing-surface thereof is increased, the cheeks may be braced together by transverse braces, arched or otherwise secured to or formed on the back edges of the cheek-plates.

The rollers and frame are preferably made of metal, the former of hard steel, though they may be made of any other material or combination of materials. Any other form of frame and mode of pivoting the rollers therein may, however, be employed, if desired.

Having now described my invention, what I claim, and desire to secure by Letters Patent of the United States, is—

1. A brake-shoe for vehicles, composed of one or more rollers and of two cheek-pieces, A, provided with bearings for the reception of the end of a brake-lever and conical bearings for the said rollers, as described, for the purpose specified.

2. A brake-shoe for vehicles, composed of one or more rollers and of two cheek-pieces, having bearings for the reception of the end of a brake-lever, in combination with the pointed screw-bolts B, and suitable tightening and check nuts, substantially as and for the purpose specified.

In testimony that I claim the foregoing I have hereunto set my hand this 7th day December, 1883.

GABRIEL CHANIER.

Witnesses:
ROBT. M. HOOPER,
LEON SCHNUTTBUHL.